Nov. 25, 1947. G. W. WHITE 2,431,654
STOCK CUTTING AND BURNISHING TOOL
Filed Nov. 3, 1944 2 Sheets-Sheet 2
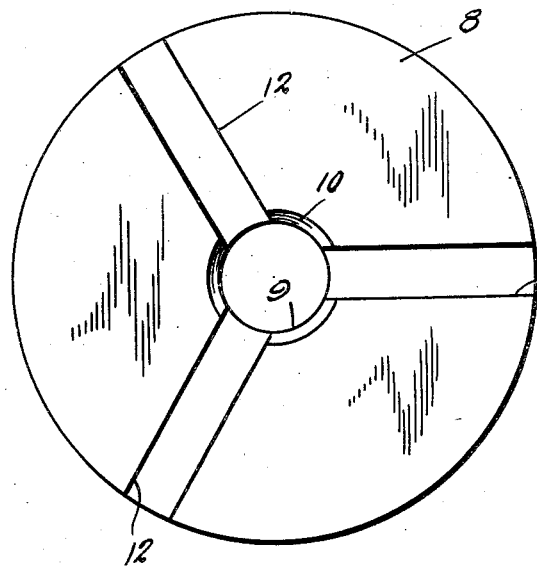
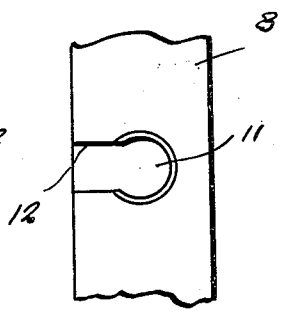
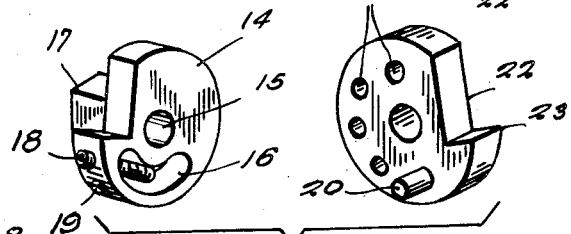
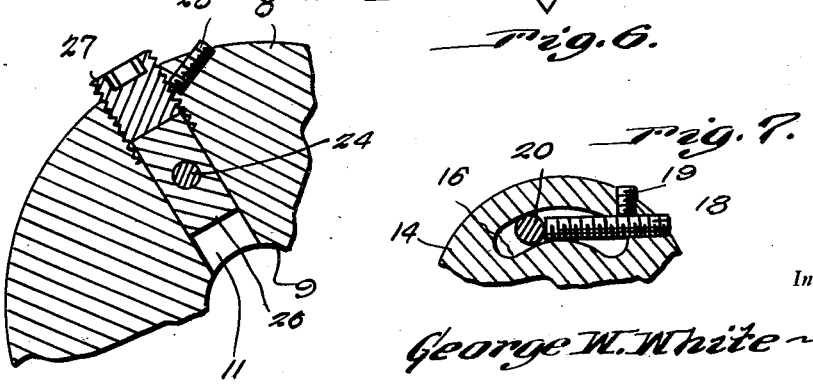
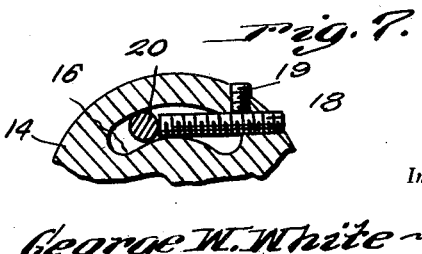
Inventor
George W. White
By Clarence A. O'Brien
and Harvey B. Jacobson
Attorneys Patented Nov. 25, 1947

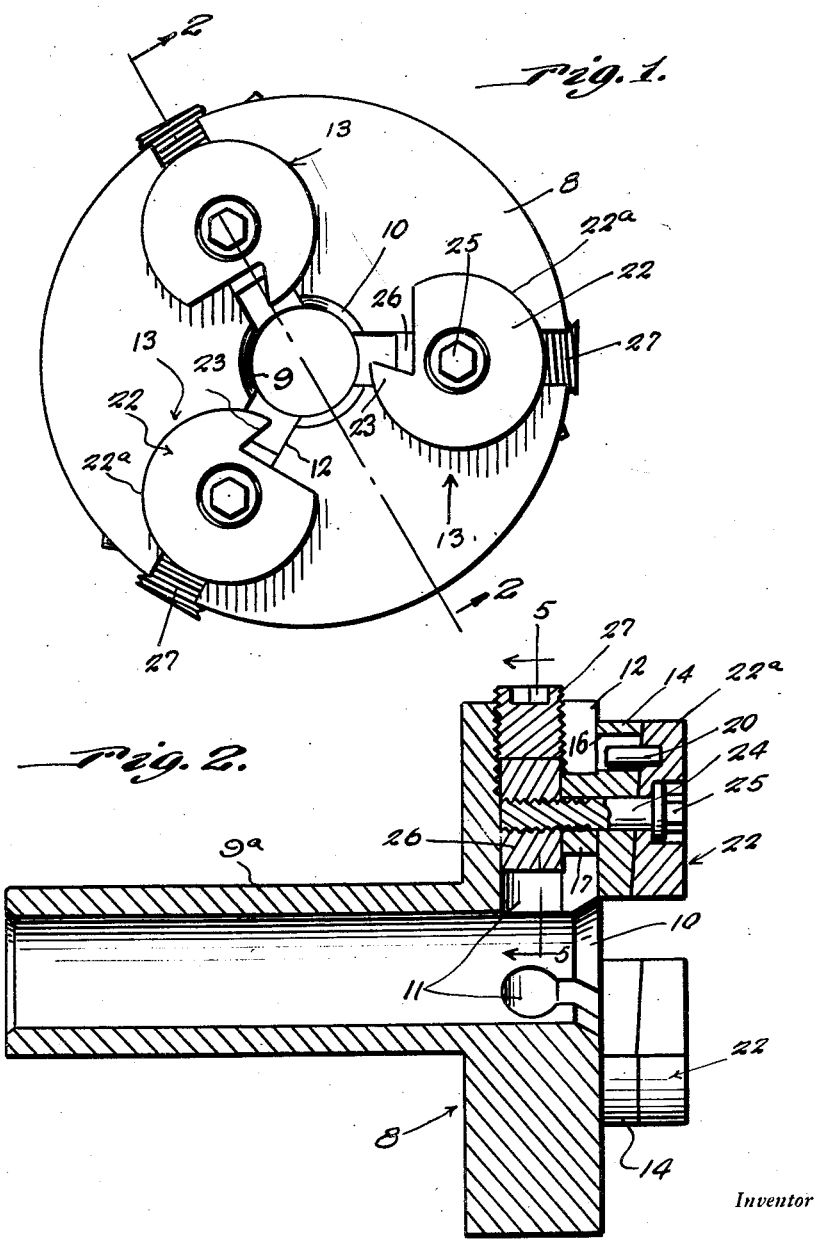

2,431,654

UNITED STATES PATENT OFFICE 2,431,654

STOCK CUTTING AND BURNISHING TOOL

George W. White, Ravenna, Ohio

Application November 3, 1944, Serial No. 561,781

4 Claims. (Cl. 29—102)

This invention relates to certain new and useful improvements in box mill rotary multiple cutting tools such as are used for precision turning of metal in machine shops.

More specifically, the improved tool is adapted for use in association with turret lathes, hand-screw-machines, automatic screw machines, and single spindle or multiple spindle machines, the same being characterized, broadly, by a disk-type head using three so-called circular form tools, these engaging the work axially of the tool and functioning for turning outside diameters on bar stock; the construction and arrangement being such as to permit the same tools to be adjusted in relation to each other for inside boring of large stock, usually 2" or larger, this depending, of course, on the size of the head and cutting tools carried thereby.

In carrying out the principles of this invention and instead of using one cutter on the cutter-head, this in combination with two rollers, as is common practice now, I eliminate the rollers and substitute two more cutters, these of circular type and all precision ground and all cutting at one time in a manner to use the cutting edge and to follow through with the peripheral edges of the cutter for burnishing, this all at the same time.

More specifically, I use a disk-like cutter head, having a central axial opening for reception of the work, there being three radial grooves leading outwardly therefrom through the marginal or peripheral edge, these grooves being equidistant in circumferential direction from each other and constituting key-ways for the cutter tool assemblies, and each of the latter being such as to permit the individual circular cutters to be separately adjusted for accuracy in cutting results and to compensate for wear.

Other features and advantages will become more readily apparent from the following description and the accompanying illustrative drawings.

In the drawings:

Figure 1 is a front elevational or face view showing the relationship of the three equi-distant cutter tools in readiness for operation.

Figure 2 is a section on the plane of the line 2—2 of Figure 1 looking in the direction of the arrows.

Figure 3 is a face view, like Figure 1, with the cutter assemblies removed to expose the radial grooves.

Figure 4 is a fragmentary marginal edge view of the cutter head seen in Figure 3 to bring out the cross sectional shape of the grooves.

Figure 5 is a fragmentary section on the plane of the line 5—5 of Figure 2.

Figure 6 is a group perspective view showing one of the cutters and the adapter block with which it has adjustable association.

Figure 7 is a fragmentary detailed view showing the cutter adjusting and locking means.

Referring now to the drawings by distinguishing the reference numerals, attention is first directed to the disk-like cutter head 8 having a central work accommodation hole 9 in alignment with the projecting barrel 9a (see Figure 2), said hole having a marginal entrance portion bevelled as at 10. Leading from this hub-hole and extending radially are the grooves. The grooves are actually made up of inner portions which are cylindrical in cross sectional form as at 11 and entrance portions 12, rectangular in cross sectional shape in communicating therewith. The cutter assemblies are denoted generally by the numerals 13 in Figure 1. Each assembly is the same in construction and description for one will suffice for all.

First, I direct attention to Figure 6 showing the substantially circular adapter and shifter block 14, this provided at its center with a hole 15 and eccentrically with an arcuate slot 16. On one side it is provided with a block-like extension for lug 17 which forms a key and which is slidable in the key-way 12, as shown in Figure 2. Referring to Figure 7, it will be seen that the adjusting screw projects somewhat tangentially as at 18 into the slot 16, the same being held in adjusted position by a set screw 19. The slot is adapted to receive an adjusting and regulating pin 20 which is selectively fitted into the marginal or circumferentially spaced keeper sockets 21 provided therefor (see Figure 6). The pin and sockets are formed in that face of the cutter 22 which contacts the corresponding face of the adapter block 14. The cutting tooth is indicated at 23 and the marginal burnishing surface or edge is indicated at 22a. It is to be noted that the meeting faces of the block 14 and the cutter 22 are bevelled to the proximate 30° angle shown, so that in effect these parts are cams shiftable in contact one upon the other. A bolt 24 having a wrench engaging head 25 passes through the aligned openings at the respective centers of the parts 14 and 22 and is threaded into a radially shiftable slide 26. This slide is movable in and out in the slide-way 11. It is held against outer movement, at the desired spot, by an abutment plug or screw 27 which is in turn locked by a set-screw 28 (see Figure 5).

This tool is adaptable for removing from 0.10 to ⅜" stock from bar stock, the face of the cutters removing the stock while the back edge of the cutter forms a burnishing surface for the finished piece of work.

The three cutters are independently adjustable so as to secure any size from 1/16" round to ¾" round with this by simple adjustment. The life of this tool is dependent upon the number of grinds, on the circular tools being 600 to 800 grinds. Adjustment is secured after grinding by adjustment screw and lock in Figure 7.

I use one pin 20 for adjustment until continual grinding renders this position inadequate, then I move the pin to the next socket 21, that is, to the left in Figure 6, thus shifting the respective cutters as desired to compensate for wear to insure accuracy in results.

By reason of the means and adjustment provided in this structure and especially as brought out in Figure 7, I am able to adjust as little as .0005 (5 tenths of a thousand) or as much more as is deemed necessary, upon boring with this tool the adjustment procedure is reversed as screw 18 would be on opposite side so as the tendency would lie against the pin instead of away from it.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a cutter construction of the class described, a supporting and assembling head provided with at least one radial groove, the groove including a cylindrical inner portion and a rectangular outer portion, the latter opening through the face of the head, an adapter block having a lug slidable in said outer portion, a slide radially shiftable in the inner portion, an adjustment and retaining abutment contacting with the outer end of the slide, a cutter superimposed against the block, and a bolt passing the cutter, block and into the slide for adjusting and assembling the parts.

2. A new article of manufacture, an adapter block having a lug and an arcuate slot, an adjusting screw carried by said block and extending into said slot, a cutter fitted against one face of said block, means assembling and connecting said cutter and block together, said cutter being provided with selectively usable sockets, a pin adjustable in said sockets, said pin being adapted to project into said slot, and also adapted to be adjusted in said slot by said adjusting screw, and the faces of said cutter and block being bevelled to provide a coacting shiftable cam action between said faces.

3. A cutter assembly for use on a cutter head of the class described comprising an elongated substantially cylindrical slide adapted to be slidably mounted in a correspondingly shaped accommodation and keying groove in a supporting and assembling head, an adapter block having an integral keying lug positioned on one face and adapted to be slidably mounted in a part of said groove and being adapted to contact and bear against said slide, said adapter block having an arcuate slot, an adjusting screw extending into said slot, a cutter fitted against one face of said block, said cutter being provided with a plurality of selectively usable pin accommodation sockets, a pin detachably mounted in one of said sockets, said pin projecting into said slot, said adjusting screw being cooperable with said pin, and a bolt passing through said cutter, adapter block, lug and threaded into a socket in said slide.

4. In a cutter construction in the class described, a disk-like cutter head having a central axial opening for the reception of the work and provided in one face with at least one radial groove, said groove opening at its outer end through the marginal peripheral edge of said head and communicating at its inner end with said central work opening, an inner portion of said groove being cylindrical in cross sectional form, and the outer communicating portion, the portion which opens through the outer face, being rectangular in cross sectional form, the rectangular portion being adapted to accommodate a guide and assembling lug, an adapter block having an integral lug slidable in said outer rectangular portion of the groove, a slide radially shiftable in the inner portion of the groove, the outer end of said groove being screw-threaded, an adjustment and retaining abutment plugged and threaded into a screw-threaded outer end portion of said groove, a cutter superimposed against said block, and a bolt passing through the cutter, and block and into the slide for adjusting and assembling the parts.

GEORGE W. WHITE.

REFERENCES CITED

The following references are of record in the file of this patent:

UNITED STATES PATENTS

| Number | Name | Date |
| --- | --- | --- |
| 417,571 | Martignoni | Dec. 17, 1889 |
| 927,527 | Hanson | July 13, 1909 |
| 863,515 | Dixon | Aug. 13, 1907 |
| 2,018,523 | Hogg | Oct. 22, 1935 |
| 425,556 | Wattie | Apr. 15, 1890 |

FOREIGN PATENTS

| Number | Country | Date |
| --- | --- | --- |
| 150,073 | Great Britain | Aug. 27, 1920 |
| 465,313 | Germany | Sept. 14, 1928 |
| 124,260 | Great Britain | Mar. 18, 1919 |